United States Patent
Kunihiro

(10) Patent No.: US 10,735,664 B2
(45) Date of Patent: Aug. 4, 2020

(54) IMAGE SHOOTING CONTROL DEVICE FOR VEHICLE, DRIVER MONITORING DEVICE, IMAGE SHOOTING CONTROL METHOD FOR VEHICLE, AND DRIVER MONITORING METHOD

(71) Applicant: MITSUBISHI ELECTRIC CORPORATION, Tokyo (JP)

(72) Inventor: Kazuki Kunihiro, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/477,612

(22) PCT Filed: Feb. 28, 2017

(86) PCT No.: PCT/JP2017/007726
§ 371 (c)(1),
(2) Date: Jul. 12, 2019

(87) PCT Pub. No.: WO2018/158809
PCT Pub. Date: Sep. 7, 2018

(65) Prior Publication Data
US 2019/0373157 A1    Dec. 5, 2019

(51) Int. Cl.
*H04N 5/235* (2006.01)
*G06K 9/00* (2006.01)
*G06K 9/20* (2006.01)

(52) U.S. Cl.
CPC ....... *H04N 5/2353* (2013.01); *G06K 9/00845* (2013.01); *G06K 9/2027* (2013.01); *H04N 5/2351* (2013.01)

(58) Field of Classification Search
CPC .... B60R 11/04; G03B 15/00; G06K 9/00845; G06K 9/2027; H04N 5/225; H04N 5/2351; H04N 5/2353; H04N 5/238
See application file for complete search history.

(56) References Cited

U.S. PATENT DOCUMENTS

| | | | |
|---|---|---|---|
| 2013/0207805 A1* | 8/2013 | Inada | B60K 28/066 340/576 |
| 2015/0116493 A1* | 4/2015 | Bala | G06K 9/00845 348/148 |
| 2017/0028987 A1* | 2/2017 | Yamada | B60N 2/0745 |

(Continued)

FOREIGN PATENT DOCUMENTS

| | | | | |
|---|---|---|---|---|
| JP | 2004-153315 A | | 5/2004 | |
| JP | 2005-323180 A | * | 11/2005 | ............. H04N 5/225 |

(Continued)

OTHER PUBLICATIONS

International Search Report, issued in PCT/JP2017/007726, PCT/ISA/210, dated May 9, 2017.

*Primary Examiner* — Mohammed S Rahaman
(74) *Attorney, Agent, or Firm* — Birch, Stewart, Kolasch & Birch, LLP.

(57) ABSTRACT

A mode selecting unit (6) selects a processing mode of occupant monitoring by using vehicle information, and an area selecting unit (7) selects an area corresponding to the selected processing mode. An exposure control unit (8) then determines an exposure setting that has to be set on an image shooting unit (2) by using luminance information about the selected area.

7 Claims, 4 Drawing Sheets

(56) References Cited

U.S. PATENT DOCUMENTS

2018/0025240 A1* 1/2018 Klement ............ G06K 9/00845
                                                            348/47
2018/0170375 A1* 6/2018 Jang ....................... B60K 28/06
2019/0056732 A1* 2/2019 Aoi ....................... G05D 1/0061

FOREIGN PATENT DOCUMENTS

| JP | 2005-323180 A | | 11/2005 | |
| JP | 2009-206811 A | * | 9/2009 | ............ H04N 5/225 |
| JP | 2009-206811 A | | 9/2009 | |
| JP | 2013-123180 A | | 6/2013 | |
| JP | 2013-164663 A | | 8/2013 | |
| JP | 2014-235410 A | | 12/2014 | |

* cited by examiner

IMAGE SHOOTING CONTROL DEVICE FOR VEHICLE, DRIVER MONITORING DEVICE, IMAGE SHOOTING CONTROL METHOD FOR VEHICLE, AND DRIVER MONITORING METHOD

TECHNICAL FIELD

The present invention relates to a device that sets an image shooting unit mounted in a vehicle as a target for control.

BACKGROUND ART

A device that performs various monitoring processes for a person in a vehicle by performing image processing on an image shot by an image shooting unit is known. As a processing mode of occupant monitoring that the device has, for example, the determination of the state of an occupant sitting in the driver's seat, the personal authentication of an occupant, and so on are provided. At that time, in order to perform an appropriate monitoring process, an area particularly needed for the monitoring process is desired to be properly captured in the image shot by the image shooting unit. For example, when the processing mode for occupant is the determination of the state of an occupant sitting in the driver's seat, an area where the face of an occupant sitting in the driver's seat exists is the area particularly needed for the monitoring process. When this area is not captured properly, it is difficult to properly determine the state of the occupant sitting in the driver's seat, e.g., drowsy driving, distracted driving, or the like.

For example, in Patent Literature 1, an image processing method including analyzing an acquired image to extract a person's face area, calculating a correction amount that makes the brightness of the extracted face area have an optimum value, and correcting the brightness of the image on the basis of the correction amount is described.

CITATION LIST

Patent Literature

Patent Literature 1: Japanese Unexamined Patent Application Publication No. 2004-153315

SUMMARY OF INVENTION

Technical Problem

In a case in which various monitoring processes for occupants in a vehicle are performed, an area needed for a monitoring process may change with a change of the processing mode for occupant. For example, there can be a case in which there is a transition from a situation in which only an area where the face of an occupant sitting in the driver's seat exists is needed to a situation in which an area where the face of an occupant sitting in the passenger seat exists is also needed, and so on.

However, in the image processing method of Patent Literature 1, such a change of the processing mode is not expected. Therefore, when the processing mode changes, the image processing method cannot provide an image in which an area needed for the monitoring process is properly captured.

The present invention is made in order to solve the above-mentioned problem, and it is therefore an object of the present invention to provide an image shooting control device for vehicle that can perform exposure control corresponding to a change of the processing mode.

Solution to Problem

According to the present invention, there is provided an image shooting control device for vehicle including: a processor to execute a program; and a memory to store the program which, when executed by the processor, performs processes of, acquiring image information about a shot image of an inside of a vehicle, the inside including a driver's seat and a passenger seat and the image information being outputted by a camera mounted in the vehicle; detecting luminance information about an area that is a target for monitoring, by using the image information acquired; acquiring vehicle information; by using the vehicle information acquired, selecting, as a processing mode of occupant monitoring, a driver state determination mode in which a state of an occupant sitting in the driver's seat is determined when the vehicle is traveling, and selecting, as the processing mode of occupant monitoring, a personal authentication mode in which an occupant sitting in the driver's seat or the passenger seat is authenticated when the vehicle is not traveling; when the driver state determination mode in which a state of an occupant sitting in the driver's seat is determined is selected, selecting an area where the face of the occupant exists from areas each of which is a target for monitoring, and, when the personal authentication mode in which an occupant sitting in the driver's seat or the passenger seat is authenticated is selected, selecting an area where the face of the occupant exists from the areas; and determining an exposure setting to be set on the camera by using luminance information about the area selected, and outputting a control signal to instruct the camera to perform image shooting using the exposure setting determined.

When multiple areas are selected, the exposure setting to be set on the camera is determined using pieces of luminance information about the respective multiple areas. When it is determined that there is not a deviation equal to or greater than a setting value between luminance information about a priority area that is an area having a highest priority among the multiple areas selected, and luminance information about an area other than the priority area, the exposure setting by which an average of the pieces of luminance information about the respective multiple areas selected is set to a target value is determined.

Advantageous Effects of Invention

According to the present invention, because an area corresponding to the processing mode for occupant is selected and the exposure setting is determined using the luminance information about the selected area, exposure control corresponding to a change of the processing mode can be performed.

DESCRIPTION OF EMBODIMENTS

Hereafter, in order to explain the present invention in greater detail, an embodiment of the present invention will be described with reference to the accompanying drawings.

Embodiment 1

Figure 1:
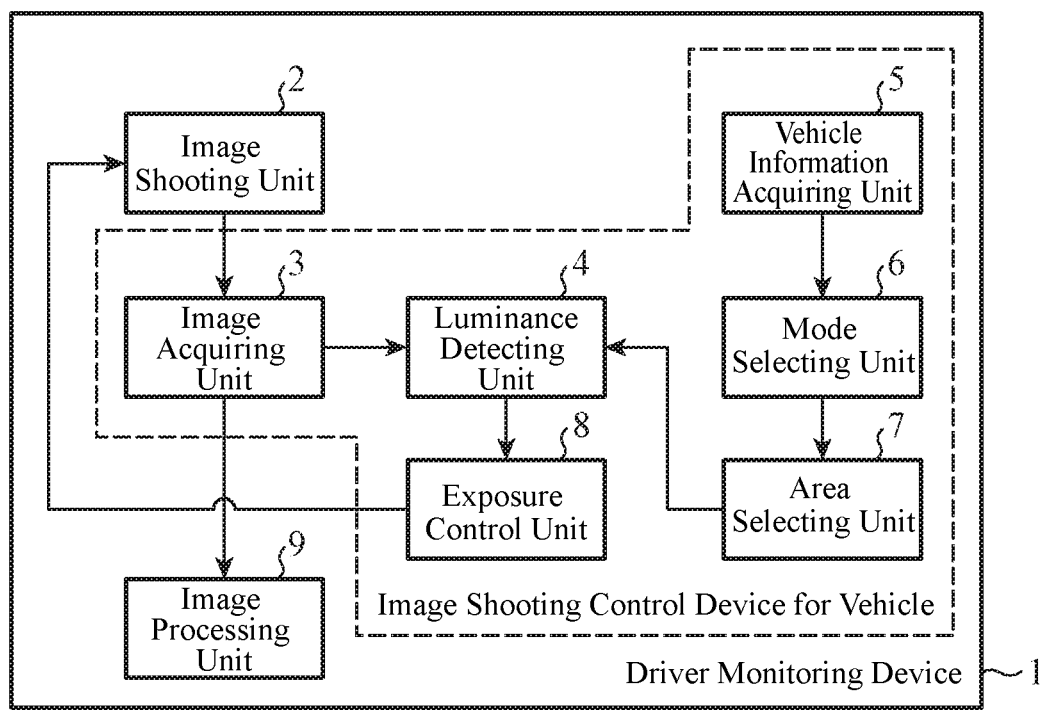
FIG. 1 is a block diagram showing the configuration of an image shooting control device for vehicle according to Embodiment 1 of the present invention.

FIG. 1 is a block diagram showing the configuration of an image shooting control device for vehicle according to Embodiment 1 of the present invention. In FIG. 1, a case in which the image shooting control device for vehicle according to Embodiment 1 is built in a driver monitoring device 1 is shown.

The driver monitoring device 1 is mounted in a vehicle, and performs various monitoring processes for an occupant existing in the vehicle. The driver monitoring device 1 has an image shooting unit 2, an image acquiring unit 3, a luminance detecting unit 4, a vehicle information acquiring unit 5, a mode selecting unit 6, an area selecting unit 7, an exposure control unit 8, and an image processing unit 9.

Figure 2:
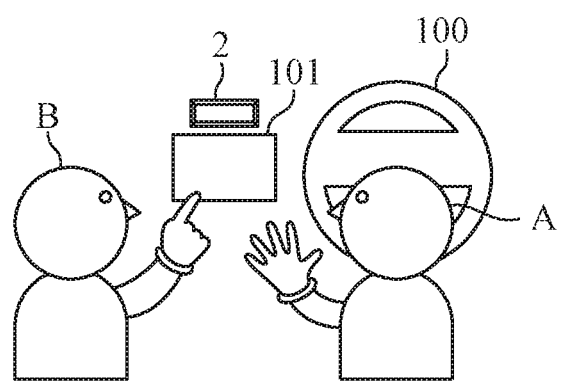
FIG. 2 is a view showing a situation inside a vehicle in which the image shooting control device for vehicle according to Embodiment 1 of the present invention is mounted.

FIG. 2 is a view showing an example of a situation inside the vehicle. The image shooting unit 2 is installed in front of occupants A and B. The occupant A sits in the driver's seat in front of which a steering wheel 100 is installed, and drives the vehicle. The occupant B sits in a passenger seat next to the driver's seat. A Center Information Display (CID) 101 is an input/output device of a device (not illustrated) having a navigation function, an Audio Visual (AV) function, and so on. Each of the occupants A and B performs a touch operation on the CID 101, to input a destination or provide an instruction to play back a piece of music. FIG. 2 shows a case in which the vehicle is a right-hand drive one, and, in a case in which the vehicle is a left-hand drive one, the arrangement shown in FIG. 2 is flipped horizontally.

The image shooting unit 2 is a camera that shoots an image of an inside of the vehicle, the inside including the driver's seat and the passenger seat, and outputs image information to the image acquiring unit 3. In the image shooting unit 2, an exposure setting at a time of image shooting is controlled using a control signal outputted by the exposure control unit 8. The exposure setting is a camera parameter such as an exposure time or ISO sensitivity. The exposure setting is not limited to the exposure time and the ISO sensitivity, and has only to be a camera parameter about exposure. The image shooting unit 2 is installed at a position where the image shooting unit can shoot an image of an inside of the vehicle, the inside including the driver's seat and the passenger seat. At a time of installation, the installation position, the angle of view, etc. of the image shooting unit can be adjusted in such a way that an image of a wider area such as the entire inside of the vehicle can be shot.

The image acquiring unit 3 acquires the image information outputted by the image shooting unit 2, and outputs the image information to the luminance detecting unit 4 and the image processing unit 9.

Figure 3:
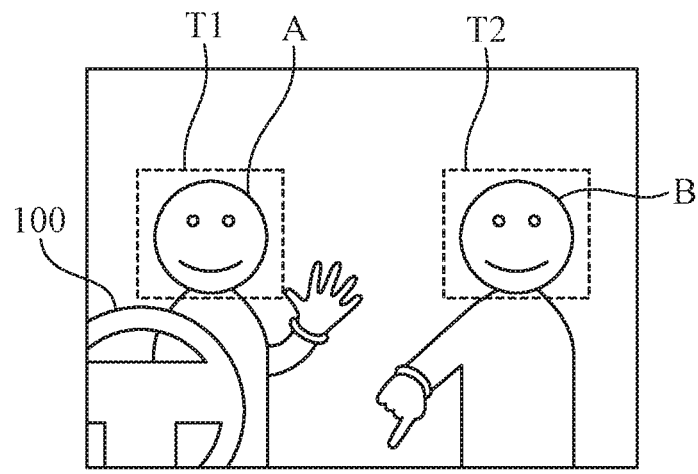
FIG. 3 is an image at a time of shooting the situation inside the vehicle shown in FIG. 2.

FIG. 3 is an example of the image shown by the image information outputted by the image shooting unit 2. This image corresponds to an image acquired by shooting the situation inside the vehicle shown in FIG. 2. In the image, an area T1 where the face of the occupant A sitting in the driver's seat exists, an area T2 where the face of the occupant B sitting in the passenger seat exists, etc. are captured.

The luminance detecting unit 4 detects, by using the image information acquired and outputted by the image acquiring unit 3, luminance information about an area that is selected by the area selecting unit 7 and that is a target for monitoring.

When the image processing unit 9 is enabled, just by monitoring one or more areas, to perform processing in each processing mode mentioned later, each of the one or more areas is referred to as an area that is a target for monitoring. For example, in a case in which the image processing unit 9 has two processing modes: a driver state determination mode and a personal authentication mode that will be mentioned later, it can be said that each of the areas T1 and T2 shown in FIG. 3 is an area that is a target for monitoring. The position of each area that is a target for monitoring, the position being on the image, is determined in accordance with the installation position, the installation angle, etc. of the image shooting unit 2, and is stored in a not-illustrated memory when the driver monitoring device 1 is installed. As an alternative, the luminance detecting unit 4 can, for example, extract the position of the face of each occupant by using the image information outputted by the image acquiring unit 3, to dynamically determine an area that is a target for monitoring.

The luminance detecting unit 4 outputs the luminance information detected thereby to the exposure control unit 8.

The vehicle information acquiring unit 5 acquires vehicle information from a not-illustrated Electronic Control Unit (ECU) or the like. The vehicle information is various pieces of information about the vehicle including the traveling state of the vehicle, and includes the vehicle speed, the shift position, a brake operation, ON/OFF of the ignition, and the open or closed states of doors. The vehicle information acquiring unit 5 outputs the vehicle information acquired thereby to the mode selecting unit 6.

The mode selecting unit 6 selects one processing mode from processing modes that are processing modes of occupant monitoring and that the image processing unit 9 has, by using the vehicle information acquired and outputted by the vehicle information acquiring unit 5. The mode selecting unit 6 outputs a result of the selection to the area selecting unit 7.

The area selecting unit 7 selects an area corresponding to the processing mode selected by the mode selecting unit 6 from the areas each of which is a target for monitoring. The area selecting unit 7 outputs a result of the selection to the luminance detecting unit 4.

The exposure control unit 8 determines the exposure setting to be set on the image shooting unit 2 by using the luminance information about the area, the luminance information being detected by the luminance detecting unit 4. The exposure control unit 8 then outputs a control signal for instructing the image shooting unit 2 to perform image shooting using the exposure setting determined thereby.

The image processing unit 9 performs image processing using the image information acquired and outputted by the image acquiring unit 3, and thereby performs a process of occupant monitoring.

As a processing mode of monitoring, for example, a driver state determination mode in which the state of an occupant sitting in the driver's seat is determined is provided. The driver state determination mode is the one in which as to an occupant sitting in the driver's seat, drowsy or distracted driving detection, deadman detection (also referred to as driving incapacitated state detection), inattentive state detection, oversight detection, safety check detection, abnormal behavior detection, or the like is performed.

In addition, for example, a personal authentication mode in which a person who is an occupant sitting in the driver's seat or the passenger seat is authenticated is provided. In this personal authentication mode, who the occupant is identified. As a result, a person who is not registered in advance is prohibited from driving the vehicle. A result of the authentication performed in the personal authentication mode can be used for any application other than the above-mentioned application. The authentication result can be used for, for example, performing control of the displayed contents of the CID 101 in accordance with the occupant. The control is performed in such a way that destinations each of which is frequently set up when the authenticated occupant uses a navigation function, pieces of music each of which is frequently played back when the authenticated occupant uses an AV function, or the likes are displayed as selection items on the CID 101 on a priority basis.

The image processing unit 9 changes the processing mode of monitoring in accordance with the situation. For example, the image processing unit 9 acquires the vehicle information via the vehicle information acquiring unit 5, and changes the processing mode on the basis of the vehicle information acquired thereby. The image processing unit 9 performs the driver state determination mode when the vehicle is travelling, and, at times other than that time, performs the personal authentication mode.

The image shooting control device for vehicle includes the image acquiring unit 3, the luminance detecting unit 4, the vehicle information acquiring unit 5, the mode selecting unit 6, the area selecting unit 7, and the exposure control unit 8.

Hereafter, examples of the hardware configuration of the driver monitoring device 1 will be explained using FIGS. 4A and 4B.

Each of the functions of the image acquiring unit 3, the luminance detecting unit 4, the vehicle information acquiring unit 5, the mode selecting unit 6, the area selecting unit 7, the exposure control unit 8, and the image processing unit 9 of the driver monitoring device 1 is implemented by a processing circuit. The processing circuit can be hardware for exclusive use, or a Central Processing Unit (CPU) that executes a program stored in a memory. The CPU is also referred to as a central processing unit, a processing device, an arithmetic device, a microprocessor, a microcomputer, a processor, or a Digital Signal Processor (DSP).

Figure 4A:
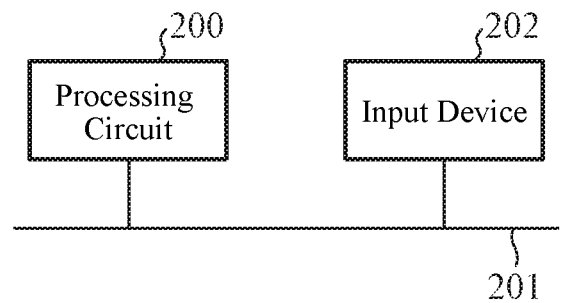
FIGS. 4A and 4B are diagrams showing examples of the hardware configuration of a driver monitoring device including the image shooting control device for vehicle according to Embodiment 1 of the present invention.

FIG. 4A is a diagram showing an example of the hardware configuration in a case in which the function of each of the following units: the image acquiring unit 3, the luminance detecting unit 4, the vehicle information acquiring unit 5, the mode selecting unit 6, the area selecting unit 7, the exposure control unit 8, and the image processing unit 9 of the driver monitoring device 1 is implemented by a processing circuit 200 that is hardware for exclusive use. The processing circuit 200 is, for example, a single circuit, a composite circuit, a programmable processor, a parallel programmable processor, an Application Specific Integrated Circuit (ASIC), a Field Programmable Gate Array (FPGA), or a combination of these circuits. The functions of the image acquiring unit 3, the luminance detecting unit 4, the vehicle information acquiring unit 5, the mode selecting unit 6, the area selecting unit 7, the exposure control unit 8, and the image processing unit 9 can be implemented by a combination of two or more processing circuits 200, or the functions of the units can be implemented by a single processing circuit 200.

The processing circuit 200 is connected to an input device 202 via a bus 201. The input device 202 is the image shooting unit 2.

Figure 4B:
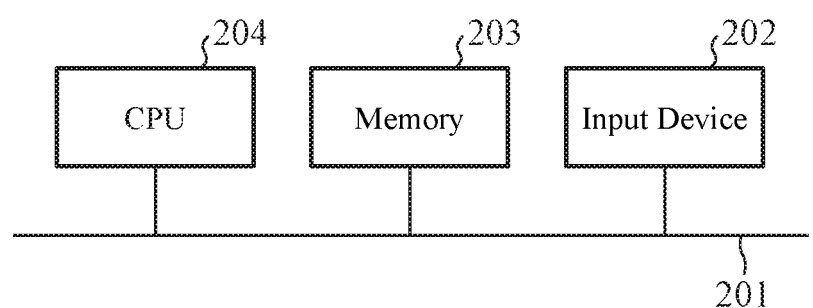

FIG. 4B is a diagram showing an example of the hardware configuration in a case in which the function of each of the following units: the image acquiring unit 3, the luminance detecting unit 4, the vehicle information acquiring unit 5, the mode selecting unit 6, the area selecting unit 7, the exposure control unit 8, and the image processing unit 9 of the driver monitoring device 1 is implemented by a CPU 204 that executes a program stored in a memory 203. In this case, the function of each of the following units: the image acquiring unit 3, the luminance detecting unit 4, the vehicle information acquiring unit 5, the mode selecting unit 6, the area selecting unit 7, the exposure control unit 8, and the image processing unit 9 is implemented by software, firmware, or a combination of software and firmware. Software and firmware are described as programs and the programs are stored in the memory 203. The CPU 204 implements the function of each of the following units: the image acquiring unit 3, the luminance detecting unit 4, the vehicle information acquiring unit 5, the mode selecting unit 6, the area selecting unit 7, the exposure control unit 8, and the image processing unit 9 by reading and executing a program stored in the memory 203. More specifically, the driver monitoring device 1 has the memory 203 for storing programs by which steps ST1 to ST3, ST10 to ST13, and ST20 to ST24, which are shown in flow charts of FIGS. 5, 6, and 7 mentioned later, are performed as a result, and so on. Further, it can be said that these programs cause a computer to perform procedures or methods that the image acquiring unit 3, the luminance detecting unit 4, the vehicle information acquiring unit 5, the mode selecting unit 6, the area selecting unit 7, the exposure control unit 8, and the image processing unit 9 use. Here, the memory 203 is, for example, a non-volatile or volatile semiconductor memory, such as a Random. Access Memory (RAM), a Read Only Memory (ROM), a flash memory, an Erasable Programmable ROM (EPROM), and an Electrically Erasable Programmable ROM (EE-PROM), a magnetic disk, a flexible disk, an optical disk, a compact disk, a mini disk, a Digital Versatile Disc (DVD), or the like.

A part of the functions of the image acquiring unit 3, the luminance detecting unit 4, the vehicle information acquiring unit 5, the mode selecting unit 6, the area selecting unit 7, the exposure control unit 8, and the image processing unit 9 of the driver monitoring device 1 can be implemented by hardware for exclusive use, and another part of the functions can be implemented by software or firmware. For example, the functions of the image acquiring unit 3, the luminance detecting unit 4, the vehicle information acquiring unit 5, the mode selecting unit 6, and the area selecting unit 7 can be implemented by a processing circuit as hardware for exclusive use, and the functions of the exposure control unit 8 and the image processing unit 9 can be implemented by causing a processing circuit to read and execute a program stored in a memory.

In this way, the processing circuit can implement each of the functions of the image acquiring unit 3, the luminance detecting unit 4, the vehicle information acquiring unit 5, the mode selecting unit 6, the area selecting unit 7, the exposure control unit 8, and the image processing unit 9 that are mentioned above by using hardware, software, firmware, or a combination of two or more thereof.

Next, an example of the processing performed by the image shooting control device for vehicle configured as above will be explained using the flow charts shown in FIGS. 5, 6, and 7.

The image shooting unit 2 outputs image information to the image acquiring unit 3 at all times. Further, the image acquiring unit 3, the vehicle information acquiring unit 5, and the image processing unit 9 perform their respective pieces of processing at all times.

Figure 5:
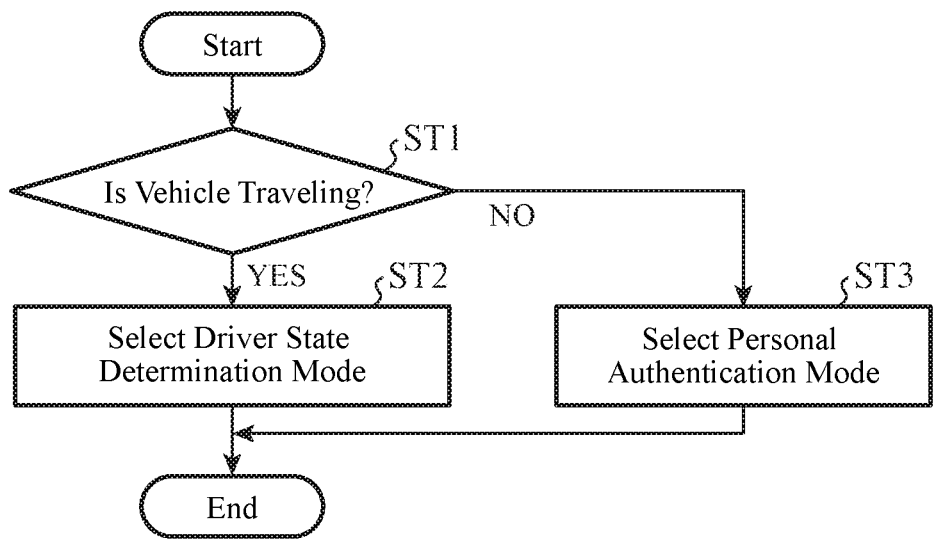
FIG. 5 is a flow chart showing an example of processing performed by the image shooting control device for vehicle according to Embodiment 1 of the present invention.

FIG. 5 is a flow chart showing the processing performed by the mode selecting unit 6.

The mode selecting unit 6 determines whether the vehicle is traveling by using the vehicle information acquired and outputted by the vehicle information acquiring unit 5 (step ST1). The mode selecting unit 6 performs the determination in step ST1 by using, for example, the vehicle speed. More concretely, when, for example, the vehicle speed is 1 km/h or more, it is determined that the vehicle is travelling.

When it is determined that the vehicle is travelling (YES in step ST1), the mode selecting unit 6 selects the driver state determination mode as the processing mode of occupant monitoring (step ST2).

In contrast, when it is determined that the vehicle is not travelling (NO in step ST1), the mode selecting unit 6 selects the personal authentication mode as the processing mode of occupant monitoring (step ST3).

A result of the selection performed by the mode selecting unit 6 is outputted to the area selecting unit 7.

Figure 6:
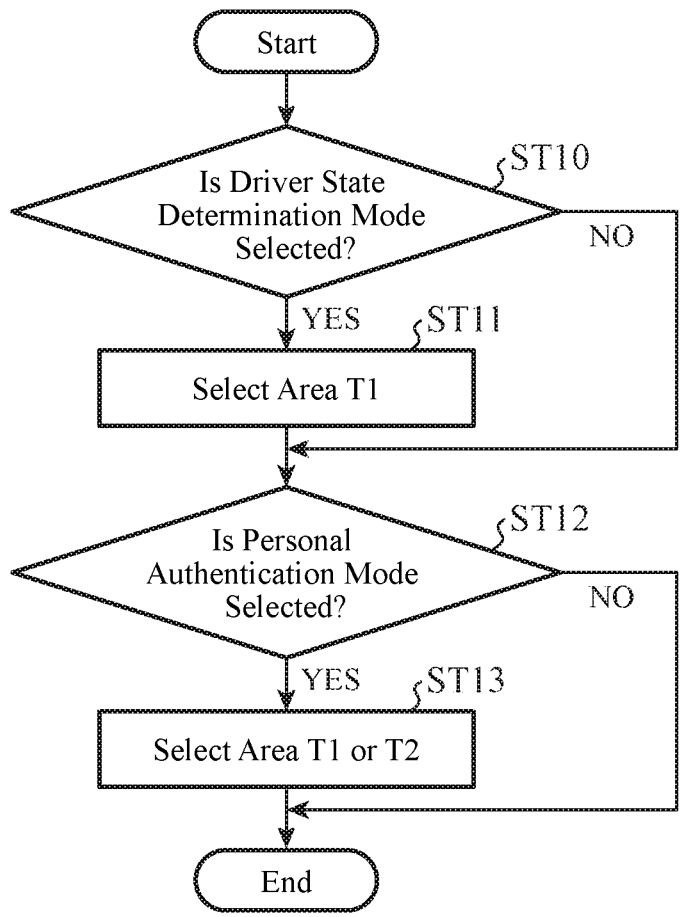
FIG. 6 is a flow chart showing an example of processing performed by the image shooting control device for vehicle according to Embodiment 1 of the present invention, and shows the processing following that of FIG. 5.

FIG. 6 is a flow chart showing the processing performed by the area selecting unit 7.

The area selecting unit 7 determines whether the driver state determination mode is selected by the mode selecting unit 6 (step ST10).

When the driver state determination mode is selected (YES in step ST10), the area selecting unit 7 selects the area where the face of an occupant sitting in the driver's seat exists, e.g., the area T1 in the case of FIG. 3 (step ST11). The process proceeds to step ST12 after step ST11.

In contrast, when the driver state determination mode is not selected (NO in step ST10), the process proceeds to step ST12 without any process being performed.

Next, the area selecting unit 7 determines whether the personal authentication mode is selected by the mode selecting unit 6 (step ST12).

When the personal authentication mode is selected (YES in step ST12), the area selecting unit 7 selects the area where the face of an occupant sitting in the driver's seat or the passenger seat exists, e.g., the area T1 or T2 in the case of FIG. 3 (step ST13). When occupants are in the driver's seat and in the passenger seat, the areas T1 and T2 can be selected, and, when no occupant is in the passenger seat, only the area T1 can be selected. Installation of seat sensors whose detection results are included in the vehicle information acquired by the vehicle information acquiring unit 5 enables the driver monitoring device 1 to determine whether an occupant exists in each seat. After the process of step ST13 is ended, the area selecting unit 7 ends the processing.

In contrast, when the personal authentication mode is not selected (NO in step ST12), the area selecting unit 7 ends the processing.

A result of the selection performed by the area selecting unit 7 is outputted to the luminance detecting unit 4.

Figure 7:
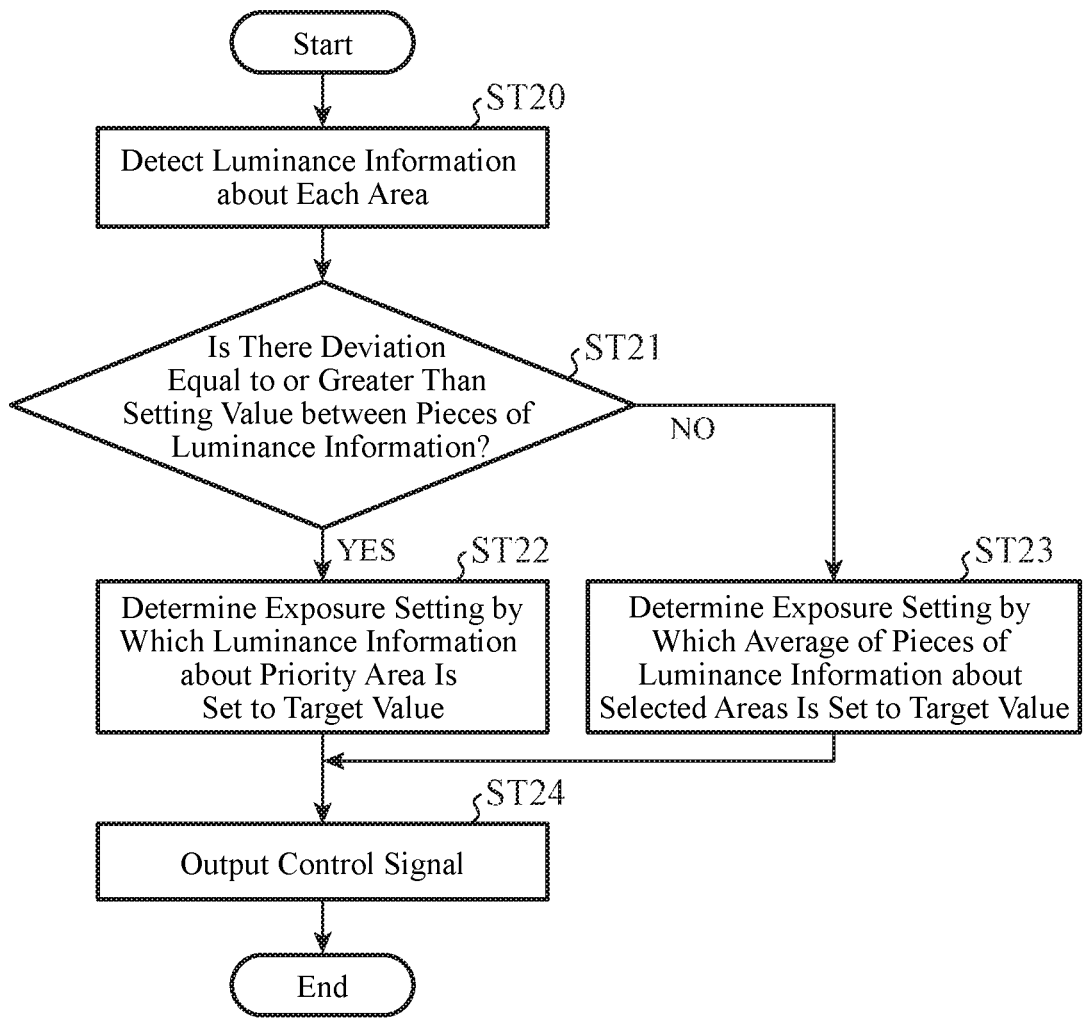
FIG. 7 is a flow chart showing an example of processing performed by the image shooting control device for vehicle according to Embodiment 1 of the present invention, and shows the processing following that of FIG. 6.

FIG. 7 is a flow chart showing the pieces of processing performed by the luminance detecting unit 4 and the exposure control unit 8. In FIG. 7, a case in which multiple areas are selected by the area selecting unit 7 will be explained as an example. Concretely, this case is the one in which the areas T1 and T2 are selected in the personal authentication mode.

The luminance detecting unit 4 detects the luminance information about each area that is selected by the area selecting unit 7 and that is a target for monitoring, by using the image information acquired and outputted by the image acquiring unit 3 (step ST20). Here, the average luminance of each area is detected as the luminance information about the corresponding area. More specifically, for each area that is selected by the area selecting unit 7 and that is a target for monitoring, the average luminance is detected. The detected pieces of luminance information are outputted to the exposure control unit 8.

Next, the exposure control unit 8 determines whether there is a deviation equal to or greater than a setting value between the luminance information about a priority area and the luminance information about an area other than the priority area, by using the pieces of luminance information detected by the luminance detecting unit 4 (step ST21). Concretely, it is determined whether the difference between the average luminance of the priority area and the average luminance of the area other than the priority area is equal to or greater than the setting value.

The priority area refers to an area having the highest priority among the areas selected by the area selecting unit 7. In the personal authentication mode, because the personal authentication of an occupant sitting in the driver's seat is more important than that of an occupant sitting in the passenger seat, the area where the face of an occupant sitting in the driver's seat exists may be set as the priority area. Regardless of such a criterion, the priority of each area can be set as appropriate. For example, when the same occupant continues sitting in the driver's seat, but an occupant sitting in the passenger seat changes frequently because of a person's getting in and a person's getting out, the area where the face of an occupant sitting in the passenger seat exists may be set as the priority area. The occurrence of getting in or out can be detected by, for example, a seat sensor.

When the deviation between the pieces of luminance information is equal to or greater than the setting value (YES in step ST21), the exposure control unit 8 determines an exposure setting by which the luminance information about the priority area is set to a target value (step ST22).

The target value is set to a value that makes it possible to properly perform the monitoring process in each processing mode. The target value does not have to refer to only one value, but can refer to all values included in a fixed range. More specifically, all values from a lower limit to an upper limit of a value range within which the monitoring process can be properly performed can be set collectively as target values.

In contrast, when the deviation between the pieces of luminance information is less than the setting value (NO in step ST21), the exposure control unit 8 determines an exposure setting by which the average of the pieces of luminance information about the multiple areas selected by the area selecting unit 7 is set to the target value (step ST23).

For example, when the priority area is extremely bright and the area other than the priority area is extremely dark, it is difficult to make both the priority area and the area other than the priority area have appropriate degrees of brightness. This is because reducing the brightness of the priority area causes the area other than the priority area to become further darker. Also, this is because reducing the darkness of the area other than the priority area causes the priority area to become further brighter. Accordingly, by performing the processes as shown in steps ST21 to ST23, when there is a deviation equal to or greater than the setting value between the luminance information about the priority area and the luminance information about the area other than the priority area, an adjustment of the luminance of the area other than the priority area is abandoned, whereas when there is no deviation equal to or greater than the setting value, an adjustment of luminance is made uniformly to all of the areas selected by the area selecting unit 7.

As evident from the above, the setting value used in the determination of step ST21 is set to a value equal to or less than a value that provides expectation of an improvement in the luminance as to all of the areas selected by the area selecting unit 7.

Next, the exposure control unit 8 outputs a control signal showing an instruction to perform image shooting using the determined exposure setting to the image shooting unit 2 (step ST24). The image shooting unit 2 changes the exposure setting thereof in accordance with the control signal received thereby, and outputs image information obtained by image shooting using the changed exposure setting to the image acquiring unit 3.

When the number of areas selected by the area selecting unit 7 is one, an exposure setting by which the luminance information about the one area is set to the target value is determined.

The pieces of processing shown in the flowcharts of FIGS. 5, 6, and 7 are repeatedly performed after the driver monitoring device 1 is powered on.

In this way, the exposure control unit 8 causes the image shooting unit 2 to, after that time, perform image shooting using the exposure setting which makes the area corresponding to the processing mode that the image processing unit 9 is going to perform has appropriate luminance.

The case in which the image shooting control device for vehicle is built in the driver monitoring device 1 is shown above. However, by building the image acquiring unit 3, the luminance detecting unit 4, the vehicle information acquiring unit 5, the mode selecting unit 6, the area selecting unit 7, and the exposure control unit 8, which are included in the image shooting control device for vehicle, in an external server, and allowing the external server to transmit and receive information to/from the image shooting unit 2 and the image processing unit 9, exposure control of the image shooting unit 2 can be remotely performed. Further, at that time, there can be provided a configuration in which transmission and reception of information is performed between the image shooting unit 2 and the image processing unit 9, and the external server, by connecting the image shooting unit 2 and the image processing unit 9 to the external server via a mobile terminal such as a smartphone in such a way that communication can be performed.

Further, the image acquiring unit 3, the luminance detecting unit 4, the vehicle information acquiring unit 5, the mode selecting unit 6, the area selecting unit 7, and the exposure control unit 8 can be built in a mobile terminal, and the mobile terminal can be caused to function as the image shooting control device for vehicle.

Further, although the average luminance of an area is set as the luminance information about the area in the above-mentioned embodiment, the mode or the median of the luminance values of the area can be alternatively set as the luminance information about the area.

Further, in the above-mentioned embodiment, the luminance detecting unit 4 acquires the result of the selection performed by the area selecting unit 7, detects only the luminance information about each selected area, and outputs the luminance information to the exposure control unit 8. However, the luminance detecting unit 4 can detect the pieces of luminance information about all the areas each of which is a target for monitoring, and output the pieces of luminance information to the exposure control unit 8, and then the exposure control unit 8 can extract the luminance information about each area selected by the area selecting unit 7 from the pieces of luminance information and use the luminance information for the processing. A specific explanation using FIG. 3 is described below. The luminance detecting unit 4 can detect the pieces of luminance information about the areas T1 and T2, and then the exposure control unit 8 can extract the luminance information about the area T1 in a case of travelling and can extract the luminance information about the area T1 or T2 in a case of not travelling to perform the process of determining the exposure setting. In this case, the result of the selection performed by the area selecting unit 7 is outputted to the exposure control unit 8 instead of the luminance detecting unit 4.

As mentioned above, in the image shooting control device for vehicle according to this Embodiment 1, the mode selecting unit 6 selects a processing mode by using the vehicle information, and the area selecting unit 7 selects an area corresponding to the selected processing mode. The exposure control unit 8 then determines the exposure setting that has to be set on the image shooting unit 2 by using the luminance information about the selected area. The exposure control unit 8 causes the image shooting unit 2 to, after that time, perform image shooting using the exposure setting determined thereby. In this way, exposure control corresponding to a change of the processing mode can be performed.

The accuracy of the monitoring process performed by the image processing unit 9 is improved through proper shooting of an image of a needed area.

Further, in the image shooting unit 2, only one camera that makes all the areas each of which is a target for monitoring enter its image shooting range should just be provided. More specifically, it is not necessary to install multiple cameras as the image shooting unit 2, and bring the multiple cameras into a one-to-one correspondence with the multiple areas each of which is a target for monitoring. Because the number of needed cameras is reduced, the cost can be suppressed.

Further, when the area selecting unit 7 selects multiple areas, the exposure control unit 8 determines the exposure setting to be set on the image shooting unit 2 by using the pieces of luminance information about the respective multiple areas. In this way, when multiple areas are selected, the exposure setting is determined using the multiple areas.

Further, when it is determined that there is not a deviation equal to or greater than the setting value between the luminance information about the priority area that is an area having the highest priority among the multiple areas selected by the area selecting unit 7, and the luminance information about an area other than the priority area, the exposure control unit 8 determines the exposure setting by which the average of the pieces of luminance information about the respective multiple areas selected by the area selecting unit 7 is set to the target value. In this way, it becomes possible to, when multiple areas are selected, shoot an image of the areas with appropriate luminance.

Further, when it is determined that there is a deviation equal to or greater than the setting value between the luminance information about the priority area that is an area having the highest priority among the multiple areas selected by the area selecting unit 7, and the luminance information about an area other than the priority area, the exposure control unit 8 determines the exposure setting by which the luminance information about the priority area is set to the target value. In this way, it becomes possible to shoot an image of an area having a higher priority with appropriate luminance.

Further, the driver monitoring device 1 mounted in a vehicle includes the image shooting control device for vehicle, the image shooting unit 2, and the image processing unit 9 that performs the process of occupant monitoring by using the image information acquired by the image acquiring unit 3. In this way, the device can be used as the driver monitoring device 1 mounted in the vehicle.

It is to be understood that various changes can be made in any component according to the embodiment, and any component according to the embodiment can be omitted within the scope of the invention.

INDUSTRIAL APPLICABILITY

As mentioned above, because the image shooting control device for vehicle according to the present invention can perform exposure control corresponding to a change of the processing mode, the image shooting control device for vehicle is suitable for use as a device that is built in a driver monitoring device including an image shooting unit and that controls the image shooting unit.

REFERENCE SIGNS LIST

1 driver monitoring device, 2 image shooting unit, 3 image acquiring unit, 4 luminance detecting unit, 5 vehicle information acquiring unit, 6 mode selecting unit, 7 area selecting unit, 8 exposure control unit, 9 image processing unit, 100 steering wheel, 101 CID, 200 processing circuit, 201 bus, 202 input device, 203 memory, and 204 CPU.

The invention claimed is:
1. An image shooting control device for vehicle comprising:
a processor to execute a program; and
a memory to store the program which, when executed by the processor, performs processes of,
acquiring image information about a shot image of an inside of a vehicle, the inside including a driver's seat and a passenger seat and the image information being outputted by a camera mounted in the vehicle;
detecting luminance information about an area that is a target for monitoring, by using the image information acquired;
acquiring vehicle information;
by using the vehicle information acquired, selecting, as a processing mode of occupant monitoring, a driver state determination mode in which a state of an occupant sitting in the driver's seat is determined when the vehicle is traveling, and selecting, as the processing mode of occupant monitoring, a personal authentication mode in which an occupant sitting in the driver's seat or the passenger seat is authenticated when the vehicle is not traveling;
the driver state determination mode in which a state of an occupant sitting in the driver's seat is determined is selected, selecting an area where a face of the occupant exists from areas each of which is a target for monitoring, and, when the personal authentication mode in which an occupant sitting in the driver's seat or the passenger seat is authenticated is selected, selecting an area where a face of the occupant exists from the areas; and
determining an exposure setting to be set on the camera by using luminance information about the area selected, and outputting a control signal to instruct the camera to perform image shooting using the exposure setting determined,
wherein when multiple areas are selected, the exposure setting to be set on the camera is determined using pieces of luminance information about the respective multiple areas, and
when it is determined that there is not a deviation equal to or greater than a setting value between luminance information about a priority area that is an area having a highest priority among the multiple areas selected, and luminance information about an area other than the priority area, the exposure setting by which an average of the pieces of luminance information about the respective multiple areas selected is set to a target value is determined.

2. The image shooting control device for vehicle according to claim 1, wherein when it is determined that there is a deviation equal to or greater than the setting value between the luminance information about the priority area and the luminance information about the area other than the priority area, the exposure setting by which the luminance information about the priority area is set to the target value is determined.

3. A driver monitoring device mounted in a vehicle, comprising:
the image shooting control device for vehicle according to claim 1; and
the camera,
wherein the processes further include performing a process of occupant monitoring by using the image information acquired.

4. An image shooting control method for vehicle comprising:
acquiring image information about a shot image of an inside of a vehicle, the inside including a driver's seat and a passenger seat and the image information being outputted by a camera mounted in the vehicle;
detecting luminance information about an area that is a target for monitoring, by using the image information acquired;
acquiring vehicle information;
by using the vehicle information acquired, selecting, as a processing mode of occupant monitoring, a driver state determination mode in which a state of an occupant sitting in the driver's seat is determined when the vehicle is traveling, and selecting, as the processing mode of occupant monitoring, a personal authentication mode in which an occupant sitting in the driver's seat or the passenger seat is authenticated when the vehicle is not traveling;
when the driver state determination mode in which a state of an occupant sitting in the driver's seat is determined is selected, selecting an area where a face of the occupant exists from areas each of which is a target for monitoring, and, when the personal authentication mode in which an occupant sitting in the driver's seat or the passenger seat is authenticated is selected, selecting an area where a face of the occupant exists from the areas; and determining an exposure setting to be set on the camera by using luminance information about the area selected, and outputting a control signal to instruct the camera to perform image shooting using the exposure setting determined, wherein when multiple areas are selected, the exposure setting to be set on the camera is determined using pieces of luminance information about the respective multiple areas, and when it is determined that there is not a deviation equal to or greater than a setting value between luminance information about a priority area that is an area having a highest priority among the multiple areas selected, and luminance information about an area other than the priority area, the exposure setting by which an average of the pieces of luminance information about the respective multiple areas selected is set to a target value is determined.

5. An image shooting control method for vehicle comprising:

acquiring image information about a shot image of an inside of a vehicle, the inside including a driver's seat and a passenger seat and the image information being outputted by a camera mounted in the vehicle;

detecting luminance information about an area that is a target for monitoring, by using the image information acquired;

acquiring vehicle information;

by using the vehicle information acquired, selecting, as a processing mode of occupant monitoring, a driver state determination mode in which a state of an occupant sitting in the driver's seat is determined when the vehicle is traveling, and selecting, as the processing mode of occupant monitoring, a personal authentication mode in which an occupant sitting in the driver's seat or the passenger seat is authenticated when the vehicle is not traveling;

when the driver state determination mode in which a state of an occupant sitting in the driver's seat is determined is selected, selecting an area where a face of the occupant exists from areas each of which is a target for monitoring, and, when the personal authentication mode in which an occupant sitting in the driver's seat or the passenger seat is authenticated is selected, selecting an area where a face of the occupant exists from the areas; and determining an exposure setting to be set on the camera by using luminance information about the area selected, and outputting a control signal to instruct the camera to perform image shooting using the exposure setting determined, wherein when multiple areas are selected, the exposure setting to be set on the camera is determined using pieces of luminance information about the respective multiple areas, and when it is determined that there is a deviation equal to or greater than a setting value between luminance information about a priority area that is an area having a highest priority among the multiple areas selected, and luminance information about an area other than the priority area, the exposure setting by which the luminance information about the priority area is set to a target value is determined.

6. A driver monitoring method comprising:

the image shooting control method according to claim 4; and performing a process of occupant monitoring by using the image information acquired.

7. A driver monitoring method comprising:

the image shooting control method according to claim 5; and performing a process of occupant monitoring by using the image information acquired.

* * * * *